(12) United States Patent
Nucci et al.

(10) Patent No.: US 9,069,898 B2
(45) Date of Patent: Jun. 30, 2015

(54) SYSTEM FOR PROVIDING REGRESSION TESTING OF AN INTEGRATED PROCESS DEVELOPMENT SYSTEM AND METHOD THEREFOR

(75) Inventors: Richard C. Nucci, Wynnewood, PA (US); Jeffrey M. Plater, Bridgeport, PA (US); Mitchell J. Stewart, Malvern, PA (US); Peter Michel, King of Prussia, PA (US)

(73) Assignee: Dell Products, LP, Round Rock, TX (US)

( * ) Notice: Subject to any disclaimer, the term of this patent is extended or adjusted under 35 U.S.C. 154(b) by 53 days.

(21) Appl. No.: 13/485,082

(22) Filed: May 31, 2012

(65) Prior Publication Data

US 2013/0326471 A1    Dec. 5, 2013

(51) Int. Cl.
G06F 9/44 (2006.01)
G06F 11/36 (2006.01)

(52) U.S. Cl.
CPC ............ G06F 11/3664 (2013.01); G06F 8/10 (2013.01); G06F 11/3688 (2013.01)

(58) Field of Classification Search
None
See application file for complete search history.

(56) References Cited

U.S. PATENT DOCUMENTS

| | | | |
|---|---|---|---|
| 5,410,675 A | 4/1995 | Shreve et al. | |
| 5,794,246 A | 8/1998 | Sankaran et al. | |
| 5,917,730 A | 6/1999 | Rittie et al. | |
| 5,953,533 A | 9/1999 | Fink et al. | |
| 6,014,670 A | 1/2000 | Zamanian et al. | |
| 6,032,158 A | 2/2000 | Mukhopadhyay et al. | |
| 6,038,590 A | 3/2000 | Gish | |
| 6,044,374 A | 3/2000 | Nesamoney et al. | |
| 6,106,569 A | 8/2000 | Bohrer et al. | |
| 6,115,690 A | 9/2000 | Wong | |
| 6,134,706 A | 10/2000 | Carey et al. | |
| 6,208,990 B1 | 3/2001 | Suresh et al. | |
| 6,223,180 B1 | 4/2001 | Moore et al. | |
| 6,339,775 B1 | 1/2002 | Zamanian et al. | |
| 6,343,275 B1 | 1/2002 | Wong | |
| 6,418,400 B1 | 7/2002 | Webber | |
| 6,626,957 B1 | 9/2003 | Lippert et al. | |
| 6,640,226 B1 | 10/2003 | Shringeri et al. | |
| 6,789,096 B2 | 9/2004 | Sankaran et al. | |
| 6,820,077 B2 | 11/2004 | Godfredsen et al. | |
| 6,820,135 B1 | 11/2004 | Dingman et al. | |
| 6,823,373 B1 | 11/2004 | Pancha et al. | |
| 6,850,947 B1 | 2/2005 | Chung et al. | |
| 6,854,107 B2 | 2/2005 | Green et al. | |
| 6,895,409 B2 | 5/2005 | Uluakar et al. | |
| 6,895,471 B1 | 5/2005 | Tse et al. | |

(Continued)

FOREIGN PATENT DOCUMENTS

WO    WO 02/102097 A1    12/2002
WO    WO 2008/134627 A2    11/2008

OTHER PUBLICATIONS

Boomi Integration Platform datasheet Boomi, Inc., 2006.

(Continued)

*Primary Examiner* — Don Wong
*Assistant Examiner* — Deric Ortiz
(74) *Attorney, Agent, or Firm* — Larson Newman, LLP

(57) ABSTRACT

A method includes providing a graphical user interface to an automated software development system, and providing a customized software application to an enterprise. The application comprises a collection of codesets that together are configured to perform an integration process.

20 Claims, 7 Drawing Sheets

(56) References Cited

U.S. PATENT DOCUMENTS

| | | |
|---|---|---|
| 6,922,831 B1 | 7/2005 | Kroening et al. |
| 6,988,165 B2 | 1/2006 | White et al. |
| 6,993,743 B2 | 1/2006 | Crupi et al. |
| 6,996,584 B2 | 2/2006 | White et al. |
| 7,117,215 B1 | 10/2006 | Kanchwalla et al. |
| 7,162,643 B1 | 1/2007 | Sankaran et al. |
| 7,171,647 B1 | 1/2007 | Smith et al. |
| 7,181,457 B2 | 2/2007 | Reinauer et al. |
| 7,496,888 B2 | 2/2009 | Sanjar et al. |
| 7,499,951 B2 | 3/2009 | Mueller et al. |
| 7,590,724 B1 | 9/2009 | Williams |
| 7,610,575 B2 | 10/2009 | Sproule |
| 7,792,784 B2 | 9/2010 | Gupta |
| 7,941,784 B2 | 5/2011 | Shenfield et al. |
| 8,036,939 B2 | 10/2011 | Gil et al. |
| 8,060,396 B1 | 11/2011 | Bessler et al. |
| 8,095,416 B2 | 1/2012 | Harvey et al. |
| 8,126,762 B2 | 2/2012 | Ramachandran et al. |
| 8,165,993 B2 | 4/2012 | Broda et al. |
| 8,271,615 B2 | 9/2012 | Ellison et al. |
| 8,276,115 B2 | 9/2012 | Bates et al. |
| 8,572,560 B2 * | 10/2013 | Drissi et al. ............ 717/120 |
| 2001/0052112 A1 | 12/2001 | Mohan et al. |
| 2002/0016771 A1 | 2/2002 | Carothers et al. |
| 2002/0073396 A1 | 6/2002 | Crupi et al. |
| 2002/0095650 A1 | 7/2002 | Green et al. |
| 2002/0104067 A1 | 8/2002 | Green et al. |
| 2003/0221184 A1 | 11/2003 | Gunjal et al. |
| 2003/0236677 A1 | 12/2003 | Casati et al. |
| 2004/0068431 A1 | 4/2004 | Smith et al. |
| 2004/0133876 A1 | 7/2004 | Sproule |
| 2005/0005262 A1 | 1/2005 | Mohan et al. |
| 2005/0198618 A1 | 9/2005 | Lalonde et al. |
| 2005/0273758 A1 | 12/2005 | Long |
| 2006/0161495 A1 | 7/2006 | Wigzell |
| 2006/0184933 A1 | 8/2006 | Chessell et al. |
| 2007/0168206 A1 | 7/2007 | McCall et al. |
| 2008/0163164 A1 | 7/2008 | Chowdhary et al. |
| 2008/0196006 A1 | 8/2008 | Bates et al. |
| 2008/0209078 A1 | 8/2008 | Bates et al. |
| 2008/0243884 A1 | 10/2008 | Mehta |
| 2008/0270977 A1 * | 10/2008 | Nucci et al. ............ 717/105 |
| 2009/0112666 A1 | 4/2009 | Guo et al. |
| 2009/0171758 A1 | 7/2009 | Alfandary et al. |
| 2009/0228428 A1 | 9/2009 | Dan et al. |
| 2010/0023362 A1 | 1/2010 | Nguyen et al. |
| 2010/0042641 A1 | 2/2010 | Kamalakantha et al. |
| 2010/0070317 A1 | 3/2010 | Pachter et al. |
| 2010/0070556 A1 | 3/2010 | Heusermann et al. |
| 2010/0070981 A1 | 3/2010 | Hadar |
| 2010/0138257 A1 | 6/2010 | Wocher et al. |
| 2010/0169148 A1 | 7/2010 | Oberhofer et al. |
| 2010/0185510 A1 | 7/2010 | Maier et al. |
| 2010/0306709 A1 | 12/2010 | Lynch et al. |
| 2010/0312542 A1 * | 12/2010 | Van Wyk et al. ............ 703/22 |
| 2010/0332510 A1 | 12/2010 | Gitai et al. |
| 2010/0332535 A1 | 12/2010 | Weizman et al. |
| 2011/0029575 A1 | 2/2011 | Sagi et al. |
| 2011/0078607 A1 | 3/2011 | Ryan et al. |
| 2011/0282715 A1 | 11/2011 | Nguyen et al. |
| 2012/0041945 A1 | 2/2012 | Blubaugh |

OTHER PUBLICATIONS

Boomi On Demand product data sheet Boomi, Inc., 2007.
Boomi AS2 Transport datasheet Boomi, Inc., 2006.
Boomi, Inc., Announces General Availability of the Boomi Integration Platform V3.0, PR Newswire, Jan. 16, 2004.
Dell Agrees to Acquire Software Firm Boomi Wall Street Journal, Nov. 3, 2010.
Silk, Scott, Automating the Balanced Scorecard Management Accounting, vol. 19, No. 11, May 1998.
Arnold, Tom, Dashboard & Scorecard Software Tools for Operations Management and Strategy Deployment Summit Media Partners, Sep. 18, 2002.
Norton, David, SAP Strategic Enterprise Management: Translating Strategy Into Action: The Balanced Scorecard SAP, May 1999.
TIBCO Staffware Process Suite product brochure TIBCO Software Inc., 2006.
Chambers, Bill et al., Real-Time Data Access Using Business Process Management VARBusiness, vol. 19, No. 23, Nov. 10, 2003.
Sturim, Robert, Achieving Competitive Advantage Through Supply Chain Integration Vitria Technology Inc., 1999.
Intalio Adds Celequest BAM Technology to Its BPMS Solution; Celequest Management Dashboards Integrated into Intalio/BPMS, Business Wire, Jan. 17, 2006.
Viane, Stijn et al., Corporate Performance Management: Beyond Dashboards and Scorecards Journal of Performance Management, vol. 20, No. 1, 2007.
Ergometrics.com web pages Ergometrics, Mar. 2000, Retrieved from Archive.org Jan. 25, 2007.
iDashes.net web pages iDashes, Inc., May 2001, Retrieved from Archive.org Jan. 25, 2007.
Performance Dashboards: Measuring, Monitoring, and Managing Your Business: Education and Research The Data Warehouse Institute, PowerPoint presentation, 2006.
Eckerson, Wayne E., Performance Dashboards: Measuring, Monitoring, and Managing Your Business: John Wiley & Sons, ISBN 13-978-0-471-724179-9, 2006.
"The Quest for a Cloud Integration Strategy," Boomi Whitepaper, 2011, http://marketing.boomi.com/QuestForCloudIntegration.html.

* cited by examiner

SYSTEM FOR PROVIDING REGRESSION TESTING OF AN INTEGRATED PROCESS DEVELOPMENT SYSTEM AND METHOD THEREFOR

CROSS REFERENCE TO RELATED APPLICATIONS

Related subject matter is contained in co-pending U.S. patent application Ser. No. 12/110,607 entitled "System and Method For Automated On-Demand Creation of a Customized Software Application," filed on Apr. 28, 2008, the disclosure of which is hereby incorporated by reference.

FIELD OF THE DISCLOSURE

This disclosure generally relates to information handling systems, and more particularly relates to providing regression testing of an integrated process development system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems. Today, most business enterprises have sophisticated computing systems that are used both for internal operations, and for communicating outside the enterprise's network.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

Figure 1:
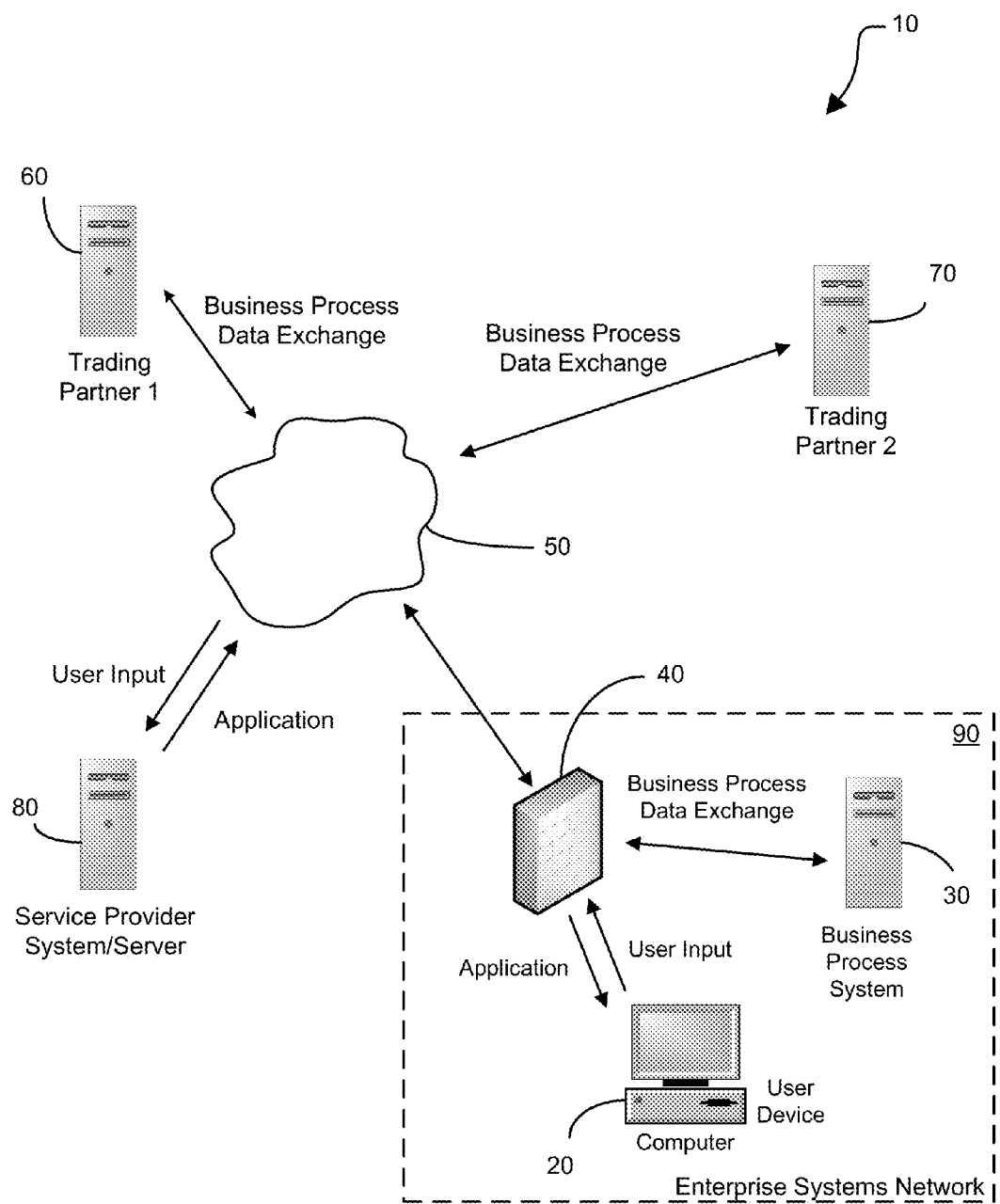
FIG. 1 is a block diagram illustrating a distributed business network system according to an embodiment of the present disclosure.

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings may be utilized in this application, as well as in other applications and with several different types of architectures such as distributed computing architectures, client or server architectures, or middleware server architectures and associated components.

Today, most businesses and other enterprises have sophisticated computing systems that are used for facilitating internal operations and for communicating outside the enterprise's network, for example to exchange information with business partners. Much of present day information exchange is conducted electronically, via communications networks, both internally to the enterprise, and among enterprises. Accordingly, it is often desirable or necessary to exchange information or data between distinctly different computing systems, computer networks, software applications, and the like. The enabling of communications between diverse systems or networks or applications in connection with the conducting of business processes is often referred to as business process integration.

Relatively recently, systems have been established to enable exchange of data via the Internet, such as via web-based interfaces for business-to-business and business-to-consumer transactions. For example, a buyer may operate a personal computer (PC) to connect to a seller's website to manually enter data using a web interface provided by the seller's computing system. In higher volume environments, a buyer may use an executable software application known as Electronic Data Interchange (EDI) Software, or Business-to-Business Integration Software to connect to the seller's computing system and to deliver electronically a business document, such as a purchase order, without requiring human intervention to manually enter the data. These applications are typically purchased from software vendors and installed on a computerized system owned and maintained by the business, in this example the buyer. The seller will have a similar or complementary software application on its system, so that the information exchange may be completely automated in both directions. In contrast to the system presently disclosed, these applications are purchased, installed and operated on the user's local system. Thus, the user typically owns and maintains its own copy of the system, and configures the application locally to connect with its trading partners.

In both the traditional and more recent approaches, the executable software application is universal or generic as to all trading partners before it is received and installed within a specific enterprise's computing network. In other words, it is delivered to different users or systems in an identical, generic form. The software application is then installed within a specific enterprise's computing network, which may include data centers, etc. located outside the physical boundaries of the enterprise. After the generic application is installed, it is then configured and customized for a specific trading partner. The customized application can be executed to exchange data between the specific trading partner and the enterprise. For example, Wal-Mart may provide on its website specifications of how electronic data such as Purchase Orders and Invoices must be formatted for electronic data communication with Wal-Mart, and how that data should be communicated with Wal-Mart. A supplier or enterprise is then responsible for finding a generic, commercially-available software product that will comply with these communication requirements and configuring it appropriately. Accordingly, the software application will not be customized for any specific supplier until after that supplier downloads the software application to its computing network and configures the software application for the specific supplier's computing network, etc. Alternatively, the supplier may engage computer programmers to create a customized software application to meet these requirements, which is often exceptionally time-consuming and expensive.

FIGS. 1-7 illustrate a system and method for automating development of customized system integration application programs. A web-based graphical interface is used to visually model an integration process, such as a business process, via a flowcharting process. During this modeling process the user selects from a predetermined set of process-representing visual elements that are stored on a remote server, such as the web server. For example, an enterprise can define an integration process to enable bi-directional exchange of data between internal applications, between internal applications and external trading partners, or between internal applications and applications running external to the enterprise. Applications running external to the enterprise are commonly referred to as Software as a Service (SaaS). Each integration process represents a complete end-to-end interface. For example, a process could be modeled to accept a purchase order (PO) from a retailer such as Wal-Mart, transform the PO into a format recognizable by a certain internal order management software application of the enterprise, and then insert the contents of that PO directly into the enterprise's order management system.

The automated software development system disclosed herein generates custom software to provide the desired interoperability as defined by an integration flowchart. The custom software may be packaged within a container program, also referred to herein as a dynamic runtime engine. The dynamic runtime engine may be an executable software application capable of running on a computer within the enterprise's network, which may include, for example, networks owned and/or operated by third party data center providers, such as OpSource, Amazon, etc. When started by a user, the executable software application connects to the automated development system and downloads an Extensible Markup Language (XML) representation of the visual model representing the integration process, and all requisite code needed to run the integration process. The required code includes a generic application template, selected predefined code sets that are selected as a function of the user's needs as defined by the modeled process, and a data code set that includes input provided by the user for customizing the stock components for a specific integration process. Additional components may be retrieved as required. As changes are made to this model, via the website, or to the code that executes the model, the executable software application will automatically check for and apply these changes as needed without requiring human intervention. The website interface of the automated software development system supports testing of an integration process model prior to generating the dynamic runtime engine. In an embodiment, the automated software development system includes a regression testing mechanism whereby users of the system can submit their process model and associated tests to be included in a regression suite. Revisions to the software development system can be validated using test cases included in the regression suite before updates to the system are released.

FIG. 1 shows a distributed business network system 10 including conventional information handling systems of a type typically found in client/server computing environments. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router, wireless router, or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

More specifically, the system 10 includes a conventional user/client device 20, such as a desktop PC, enabling a user to communicate via a communications network 50, such as the Internet. The exemplary user device 20 may be configured with conventional web browser software. The web browser, such as Microsoft Corporation's Internet Explorer web browser software, allows the user to interact with websites via the network 50. The client device 20 is positioned within an enterprise network 90 behind an enterprise network's firewall 40. For illustrative purposes, the enterprise network 90 includes a business process system 30, which may include conventional computer hardware and commercially available Enterprise Resource Planning (ERP) and other business process software, such as QuickBooks, SAP's MySAP ERP, Oracle's OneWorld JD Edwards ERP, Infor's WMS application, and the like. The system 10 further includes trading partner systems 60 and 70 for receiving and/or transmitting data relating to business-to-business transactions. For example, Wal-Mart may operate trading partner system 60 to allow for issuance of purchase orders to suppliers and to receive invoices from suppliers in electronic data form as part of electronic data exchange processes of a type well known in the art.

The system and methods disclosed herein allow an enterprise to obtain the capabilities needed to conduct the electronic exchange of data with one or more trading partners, internal applications, or applications available via the Internet, commonly referred to as Software as a Service. Examples of data to be exchanged using the software include: receipt of purchase orders from a trading partner system 60, issuance of invoices to a trading partner system 60, issuance of an advance shipment notice to system 60, and the like. Any information that is communicated between organizations in a high volume and redundant manner is a candidate to be automated using integration software such as this. The present disclosure provides these capabilities in a unique fashion by providing the enterprise with a software application including the configuration information required for conducting the integration process, and also the executable code needed to make the process run, and specially configuring this application to run within the enterprise's network, for example, behind the firewall of the enterprise or within a third-party-hosted data center, etc., that is considered to be part of the enterprise's network so that it may connect to various software applications running internal to the enterprise's network.

In accordance with the present disclosure, a service provider facilitates creation of customized software applications as defined by a user or customer of the service. The service provider operates a server/system 80 within the network 10. The system 80 may be specially configured in accordance with the present disclosure, and may be capable of communicating with devices in the enterprise's network 90. It should be noted that the communication between system 80 and network 90 is essentially unidirectional in that communications/communication sessions originate from network 90 to system 80, and not from system 80 to network 90. Accordingly, the network 90 need not have its firewall 40 modified to allow incoming traffic from communications sessions originating from system 80.

Figure 2:
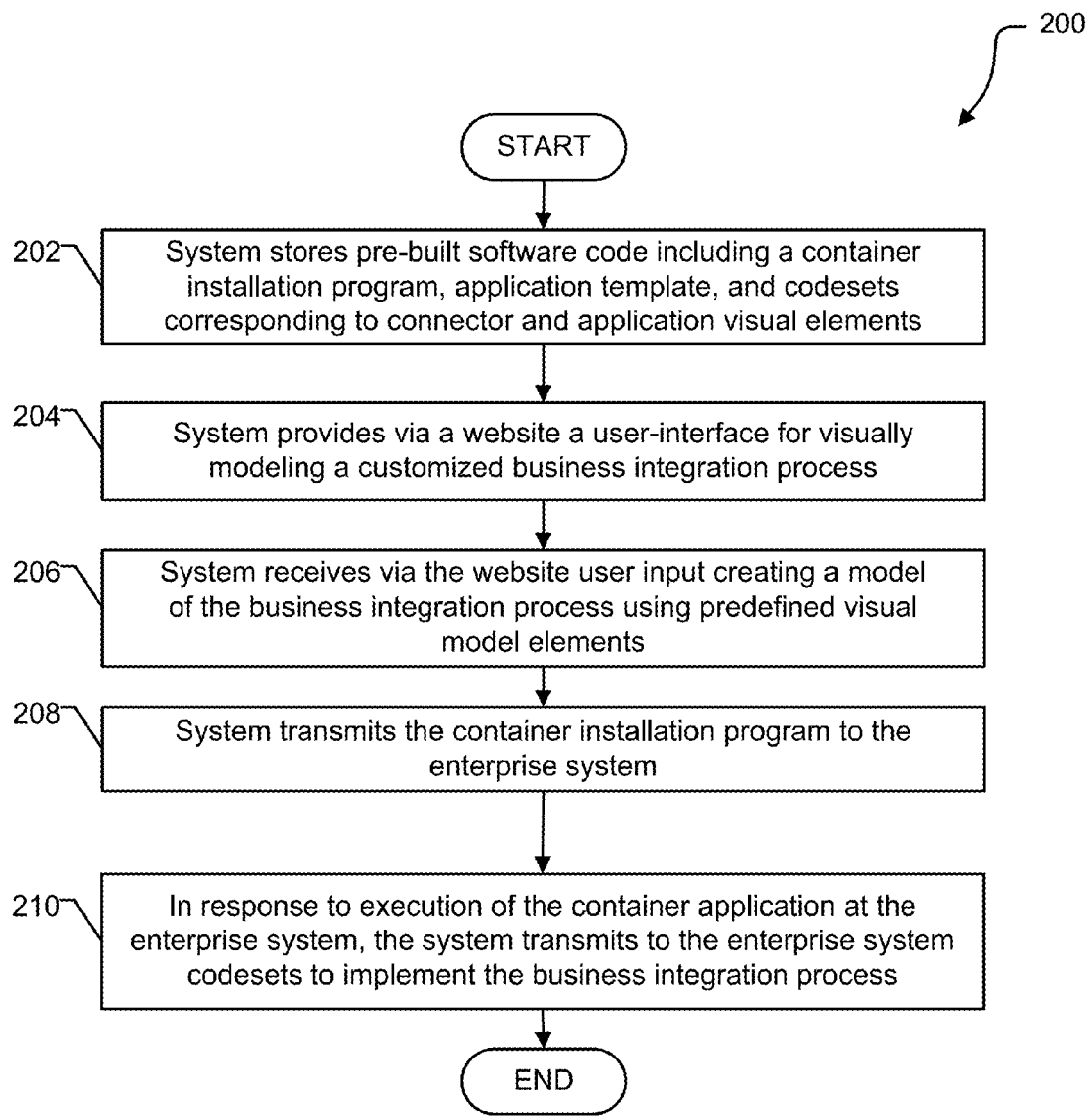
FIG. 2 is a flow diagram illustrating a method for automating creation of a customized software application according to an embodiment of the present disclosure.

FIG. 2 shows a method for automated creation of a customized software application according to an embodiment of the present disclosure. The method begins at block 202 where pre-built software code is stored at the development system. For example, the service provider system 80 is specially-configured in accordance with the present disclosure to store pre-defined datasets in its memory. Such data includes a pre-defined container installation program, referred to herein as a dynamic runtime engine, application templates, and codesets associated with process elements. After a user has defined and tested an integration process using the automated software development system using a web interface at the system 80, the dynamic runtime engine application can be downloaded to the enterprise system 90. Execution of the application at the enterprise 90 results in the installation of software custom-configured to implement the specified integration process. The application template is preferably provided in the form of an XML representation of the execution steps to be carried out by the customized software application, which in this example provides business process integration functionality, as modeled by the user, using a provided graphical user interface.

The application template includes references to specific pre-built software code stored on the service provider system 80, and references to how the pre-built code should be configured for execution within an enterprise's computing network, or other network of choice. The integration process can provide for exchange of business integration data between the enterprise's computing system(s) within the enterprise's network, and/or between the enterprise's computing system(s) and trading partners' systems external to the enterprise's network, and/or between the enterprise's internal computing system(s) and the enterprise's computing systems external to the enterprise's network, commonly referred to as Software as a Service (SaaS). For example, the application template may be constructed as an integration of customer data between Salesforce.com and SAP using Java programming technology.

The application template corresponds to the modeled integration process, but is not itself configured for use with any particular enterprise, or any particular trading partner. Accordingly, the application template is not yet ready for execution to provide business integration functionality for any particular trading partner or enterprise. Instead, the application template requires additional code and/or data to be so configured. Preferably, the application template has a conceptual design that is modular in nature, and thus permits it to function with any selected ones of several different additional components, as discussed below. The dynamic runtime engine installation program, the dynamic runtime engine program and the application template may be used by different enterprises/customers of the service provider.

Documents that are read into or sent out of a business process can be associated with a data profile. A data profile associated with a document, or with an application as a whole, includes the names of data fields included in the document. The data profile also can describe the layout or format of respective documents. For example, a data profile can include delimiters or column positions, data types, minimum/maximum string lengths, and the like. Profiles are most notably used in association with data maps. Data maps describe how information can be transferred from one document to another. For example, to transfer information included at an XML document to a flat file, the format of each document can be encoded using a respective data profile. Additionally, an application can use a data profile to inspect a corresponding document. Accordingly, a data maps include a source data profile, a destination data profile, and mapping information indicating a correspondence between each fields of the source data profile and a respective field of the destination data profile.

The pre-built software code includes Data Profile codesets. A data profile is needed specifically when the data being sent/received must be parsed, have its contents examined programmatically, or otherwise be processed by the container application, such as when data is routed based on the value of a particular field, or when a piece of data is transformed from an XML format, for example, to a Flat File format. A Data Profile codeset may be stored in a database as a combination of executable software code and XML containing configuration information about the usage of the Data Profile codeset. A Data Profile codeset may describe the originating format and structure of certain data to be integrated, the destination format and structure of such data, a data map for retrieving data from certain fields in a source document and inserting it into a certain field in a destination document, and the like. For example, a Data Profile codeset may exist for a purchase order to indicate originating and destination formats of a particular purchase order, what the source document is, where certain data in the source document must appear in the destination document, etc. Each Data Profile codeset is associated with a specific data element to be integrated. The Data Profile codesets may be used by different enterprises/customers of the service provider.

The pre-built software code further includes Connector codesets. Each Connector codeset includes code for communicating with a specific software application or system. For example, the Connector codesets may be stored in a database as a combination of executable software code and XML containing configuration information about the usage of the Connector codeset. Each Connector codeset is configured to provide connectivity to specific software applications, databases and/or systems. Each Connector codeset is specially configured to enable communication with the application, etc. in the proprietary Application Programming Interface (API) utilized by that application and/or system.

Each Connector codeset is associated with a visual connector element that abstracts away the technical details of how this communication occurs, greatly simplifying the process of communicating with the target application or system. Accordingly, a user can visually configure the connector element, and the associated Connector codeset, by entering simple values into a dialog box within the application, thus avoiding a need to write computer code and understand the underlying proprietary protocol being used. This permits a layperson to use the application to create a customized software application, without the need for a computer programmer.

Preferably, a respective Connector codeset is provided for each commercially available and/or known software application/system. For example, there may be a Connector codeset for QuickBooks software, another for a specific SAP system, and another for customer relationship management (CRM) provided by Salesforce, which is a SaaS solution. Connector codesets may be used to communicate between different application software/systems within a single enterprise system, as discussed in greater detail below, or they may be used to insert or extract data for exchange with an external trading partner. Accordingly, the Connector codesets are conceptually modular in that a corresponding Connector codeset may be selected for use in conjunction with the application template to provide a customized software application for exchanging data with specific software applications/systems. Further, the Connector codesets may be used by different enterprises/customers of the service provider.

The service provider system 80 is specially-configured in accordance with the present disclosure to store in its memory a Trading Partner codeset for each of several different trading partners. The Trading Partner codesets may be stored in a database or otherwise in a memory of the system 80, as various XML documents, each including respective data for each of a plurality of different trading partners. For example, there may be an XML document including information for communicating with trading partner system 60. The document may include respective communication parameters relevant for the respective trading partner, such as an identification of the Internet protocol to be used for communication, such as HTTP, an applicable security standard to be complied with, such as Applicability Statement 2 (AS2), an applicable URL or other network address information to be used for communication. Other parameters can be included in the document, such as electronic data interchange (EDI) parameters, formats, an Interchange Id, an Application Id, Primary and Secondary contact information, and the like. The Trading Partner codesets are conceptually modular in that any selected Trading Partner codeset, such as an XML document, may be selected for use in addition to the application template to provide a customized software application for exchanging data with the trading partner. The Trading Partner codeset may be used by different enterprises/customers of the service provider.

The system 80 is further specially configured in accordance with the present disclosure to provide web server functionality for presenting a user-accessible website, as shown at block 204 of FIG. 2. Communications between the user device 20 and the system 80/website may be performed using conventional communications technologies, such as the HTTPS protocol. The website is specially configured to provide a graphical user interface providing a visual designer environment permitting a user to define process flows between applications/systems, such as between trading partner and enterprise systems, to model a customized business integration process. The graphical user interface may be used by different enterprises/customers of the service provider.

The interface provides a menu of pre-defined user-selectable visual elements, and permits the user to arrange them as appropriate to model a process. The elements may include visual, drag-and-drop icons representing specific units of work required as part of the integration process, such as invoking an application-specific connector, transforming data from one format to another, routing data down multiple paths of execution by examining the contents of the data, business logic validation of the data being processed, etc. Information and computer executable instructions for presenting such a graphical user interface are stored in a memory of the service provider system 80.

At block 206, a user can select and arrange these visual elements using the graphical user interface at the website provided by the service provider system 80. The graphical user interface allows the user to provide user input, such as information relating to trading partners, activities, enterprise applications, enterprise system attributes, and/or process attributes that are unique to a specific enterprises end-to-end business integration process. For example, the graphical user interface may provide drop down or other user-selectable menu options for identifying trading partners, application connector and process attributes/parameters/settings, and the like. Dialog boxes facilitate providing textual entries by the user, such as to describe the format and layout of a particular data set to be sent or received, for example a Purchase Order.

XML representations of the model and the information provided by the user are stored by the system 80 in association with the user's/enterprise's account. This allows this information to be stored, retrieved, modified, transmitted, etc. Information provided by the user that relates to the enterprise system may optionally be saved by the system 80 for subsequent use by the user in modifying the customized application software, or for developing customized application software for integrating other business processes. Trading partner data not previously stored by the system may be gathered by prompting the user to supply such information via the website interface, and that such gathered information may subsequently be saved by the system 80 for subsequent use by the same or other users.

Figure 3:
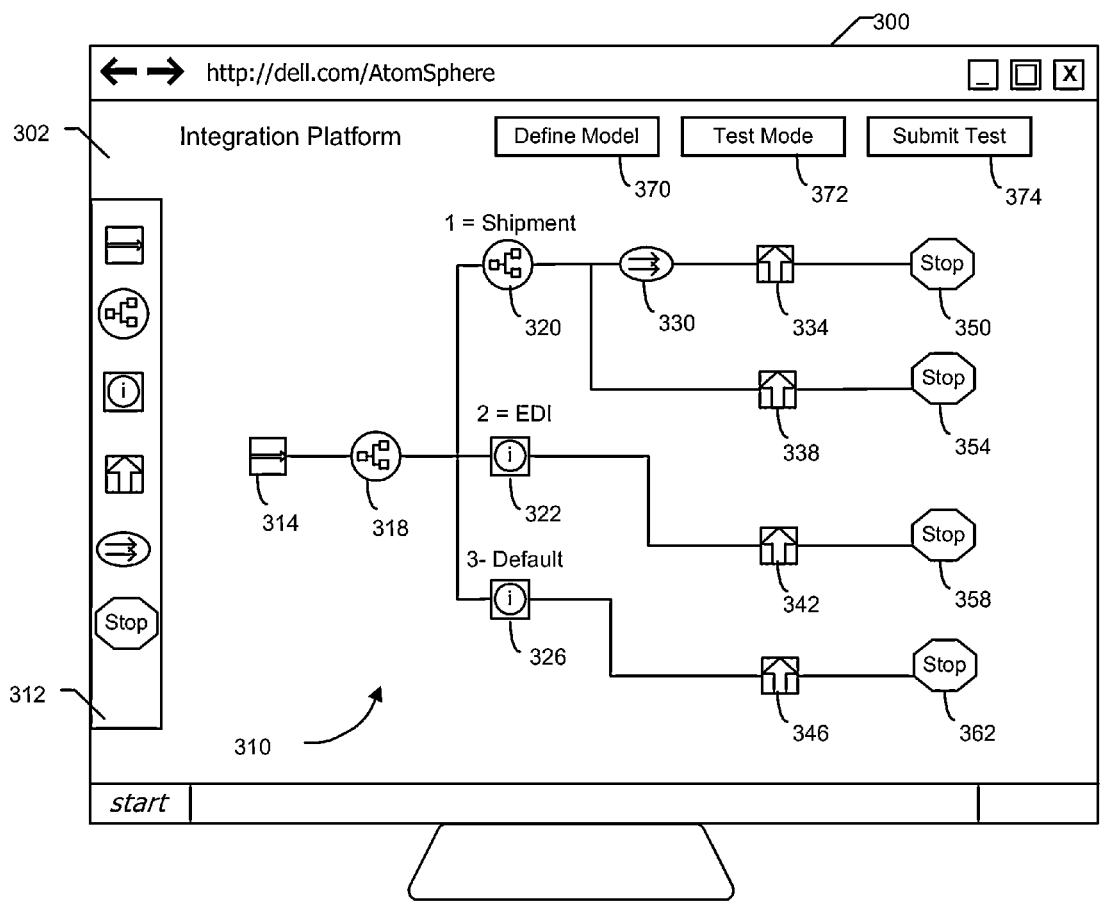
FIG. 3 illustrates a graphical user interface for developing a system integration application program according to an embodiment of the present disclosure.

FIG. 3 shows a graphical user interface 302 of an integration platform displayed within a web browser window 300 according to an embodiment of the present disclosure. The exemplary graphical user interface 302 displays an exemplary business process integration model 310 in the form of a flow diagram modeling a shipment order business process. The visual model may be created by a user within the visual designer environment, via the website interface provided by the system 80. The graphical user interface 302 can include graphical buttons, such as buttons 370, 372, and 374 that are associated with respective functions. For example, the button 370, when selected by a user, can configure the graphical user interface to display the model definition screen presently displayed at the graphical user interface of FIG. 3. The button 372, when selected, configures the interface to provide a test environment and associated features applicable for verifying operation of the process integration model 310. The button 374, when selected, submits a test artifact representative of a user's test case to a test-regression suite maintained by the service provider for use by the provider during validation of the automated software development system. The graphical user interface 302 illustrated at FIG. 3 is simplified for clarity. One skilled in the art will appreciate additional menus, dialog boxes, buttons, and the like, can be provided. In addition, the interface can be dynamically customized to support alternate functionality, such as parameter configuration, testing, code generation, and the like.

The flow diagram of FIG. 3 includes an Inbound connector element 314, Routing process elements 318 and 320, Document Property elements 322 and 326, Data Transformation process element 330, Outbound connector elements 334, 338, 342, and 346, and Process End elements 350, 354, 358 and 362. Various ones of these elements are selected from a menu 312 of elements and arranged by the user relative to one another as appropriate to model a corresponding business process. The elements may require data input from a user. For example, the inbound connector element 314 selected from the menu by the user may be configured by the user for a specific enterprise and process by the user's selection of the element and completing dialog boxes, selecting menu items, etc. as appropriate. For example, the user may provide as input for configuring data entry element 314 that the data will be inbound from an SAP system. This may be performed via a data entry field displayed in the window upon selection of data entry element 314. The element, in combination with any required data input, may be associated with a specific Connector code set stored in the memory of the system 80.

The outbound connector elements may be similarly configurable. For example, the last step of the integration process may involve sending shipping order data to Company X system. The Shipping Order will be prepared as an XML message, which is a readily recognizable format. The XML message is then sent to the outbound connector, and the outbound connector converts the XML message from this simple, recognizable format into the proprietary format that is understood by the SAP system. This conversion, and the need for it, is transparent to the user configuring the integration process. By way of further example, the routing element may require input for routing logic to be applied, and the Document Properties element may require input for file naming, file storage location, etc. to be applied. There may be other elements as appropriate or necessary for modeling business processes, as desired.

Each branch of the flow diagram represents an end-to-end business process to be integrated. In the example of FIG. 3, the first (top-most) branch may model a process involving receipt of data from an SAP system in a corresponding format, routing the data according to prescribed logic (for example, 1=shipment), further routing according to further logic, transforming the data from the SAP system format to the destination system format by Data Transformation process element 330 to create an appropriately formatted XML document, and then transmitting the transformed data to the destination system in accordance with the properties and attributes of the outbound application connector 334. Examples of other common activities include synchronizing customer data between applications, synchronizing product information between applications, notification of receipt of goods ordered by a retailer, receipt of a work related injury claim, and many others.

As referenced above, the website interface may provide menus, dialog boxes or other input-receiving fields or devices permitting textual or other entries by the user to provide information, parameters, settings, attributes, and the like, that are specific to a certain enterprise, trading partner, process, etc. This information can be provided as properties or attributes of one of the visual modeling elements. For example, a user modeling an integration process for receiving purchase orders may select an outbound connector element, and then provide input for the outbound connector element to identify a specific software application within the enterprise that should receive purchase order data the enterprises' unique system parameters such as a hostname for the purchase order processing application, a valid username and password for use of the purchase order processing system, port listings for receiving/posting data, etc.

This modeling by the user results in the system's receipt via the website of user input modeling business processes to be integrated, and user input providing information relating to specific trading partners, the enterprise, the process, etc. Accordingly, the system is aware of the applications on both the source and destination ends, in this example the trading partner and enterprise ends, and parameters for automating the business process, and can use this information to dynamically and automatedly create a customized software application for integrating the modeled business process.

After storing the completed model, the system 80 can transmit the dynamic runtime engine installation program stored in its memory to the enterprise system 90, for example to user device 20, as shown at block 208 of FIG. 2. As discussed above, execution of the dynamic runtime engine installation program within the enterprise network 90 installs an executable dynamic runtime engine application on the user device. When the dynamic runtime engine application is executed, it initiates communication with the system 80. In response to execution of the dynamic runtime engine application at the enterprise network 90, the system 80 selects pre-defined codesets stored in its memory that will be required by the enterprise system to automatedly execute the modeled integration process, as shown at block 210. The system 80 selects codesets from all codesets stored in its memory as a function of the model, such as the elements selected by the user in creating the model, and as a function of the parameter/setting, etc. information provided by the user in step 206.

For example, if the user has modeled a process by selecting inbound connector 314 at block 206, and the user has provided data identifying trading partner Z will provide the inbound data represented by inbound connector 314, then the system 80 will select the Connector codeset associated with an inbound connector, and the Trading Partner codeset associated with trading partner Z, and Data Profile(s) that correspond to the activities and/or data being exchanged with trading partner Z. It may be known from the data provided by the user or from the Trading Partner codeset that the incoming data will be coming from software application A. Accordingly, the system may further select a codeset relating to use of software application A, and/or any other codesets stored in the memory of system 80 that are referenced by a codeset it has already selected. This allows the system 80 to determine which pre-built software components (XML documents) are needed for the final executable software application. For example, if the user has created a model including inbound connector 314, and configured inbound connector 314 to specific that the inbound data will be coming from an SAP system, the system is configured to identify a corresponding pre-built Connector codeset stored in its memory that is required for receiving data from the SAP system.

For example, an integration process may be modeled that uses an AS2 application connector element, which is associated with an AS2 Connector codeset required for communicating with the systems of many retailers such as Wal-Mart, and this same process could also utilize a database connector, because the enterprise has developed a database where data received from Wal-Mart is to be stored. In this example, the integration process could be modeled to receive Purchase Orders from Wal-Mart. It may contain several steps, such as (1) invocation of the AS2 application connector as described above for securely receiving the incoming data from Wal-Mart, (2) a data transformation step to transform the data from Wal-Mart's format to a format recognizable by the internal database system, and (3) an invocation of the Database Connector to deliver the purchase order to the database system.

Accordingly, the system 80 receives via the website user input allowing the system 80 to search its database and select from various pre-stored code only those selected codesets, data, application templates, etc. required to build a customized software application for automatedly integrating the modeled business process. The appropriate application template may be selected as a function of the process modeled by the user. When the selected codesets are combined with the selected application template and the user information codeset, they collectively provide an executable customized software application for automatedly integrating the modeled business process. The system then transmits to the enterprise network 90 the generic executable application template stored in its memory, the codesets selected at block 210, and a codeset capturing the information provided by the user. In the example of FIG. 1, the application may be received and stored by either device 20 or business process system 30. The application, whether executed at the user device 20 or business process system 30, is then operable to exchange data between the business process system 30 and a trading partner's system 60. For example, the process may be scheduled to execute periodically, such as every night, every 2 hours, etc., to exchange data.

Figure 4:
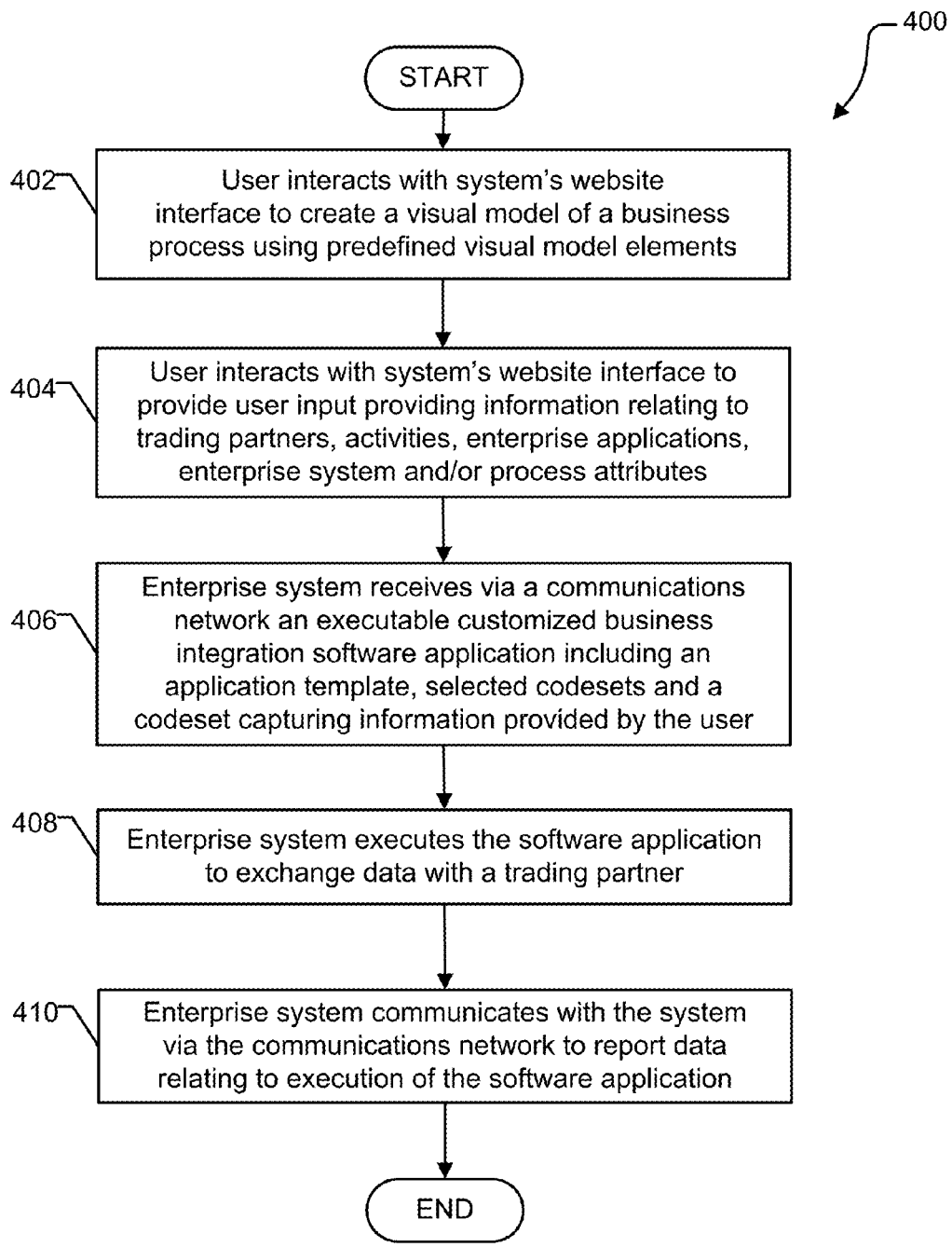
FIG. 4 is a flow diagram illustrating the method of FIG. 2 from the point of view of a user of an automated software development system according to an embodiment of the present disclosure.

FIG. 4 shows a method 400 for automated, on-demand creation of a customized software application in accordance with an embodiment of the present disclosure, shown from a user's perspective. The method begins at block 402 where a user interacts with the website interface of the system 80. The user can interact with the website using Microsoft's Internet Explorer or a similar web browser, and conventional hardware/software for browsing and interacting with websites. The user interacts with the website to build a visual model of business process activities to be automated by selecting pre-defined business process elements from a menu of generic business process elements displayed via the interface, as described above.

Further, the user interacts with the website to provide user input providing enterprise-specific or process-specific parameters, settings, data, attributes, and the like for customizing the generic business process element to the specific business process of a specific enterprise, as discussed in greater detail above, as shown at block 404. The user can continue to utilize system 80 to create new integration processes, and can deploy the integration process to the same dynamic runtime engine previously installed, or setup a new dynamic runtime engine for the new integration process to be downloaded and installed in.

After the integration process has been modeled to meet the requirements of the enterprise, the enterprise system receives via the network a dynamic runtime engine installation program, download of which is initiated by the user. Upon execution of the installation program by the user, a dynamic runtime engine application is installed. Execution is initiated in a conventional manner, such as by invoking a Start command from the menu of the operating system where the installation program has been installed. This application is installed by the user in the same network 90 in which the applications to be integrated reside.

Upon execution of the dynamic runtime engine program within the user's network, for example at user device 20 or business process system 30, the dynamic runtime engine connects to the service provider system 80 via the network 50, and initiates download of software components from the system 80 that collectively will provide an executable customized process-specific automated business integration software application. More specifically, the dynamic runtime engine initiates transmission from the system 80 to the enterprise network 90 of the generic application template and the codesets that have been selected (see FIG. 2, step 210) because they are associated with the elements of the model built by the user, or are referenced by the codesets associated with the elements of the model. Further, the dynamic runtime engine initiates transmission from the system 80 to the enterprise network of a codeset capturing enterprise/process-specific information provided by the user, for example to configure the generic elements with enterprise/process-specific parameters, attributes, settings, etc. These software components are transmitted from the system 80 into the enterprise system, such as to a destination within the enterprise system, for example to user device 20 or business process system 30 behind the enterprise system's firewall 40. These software components may be transmitted in the form of one or more data files using conventional file transfer technologies, such as HTTPS or FTP.

Accordingly, the dynamic runtime engine downloads to the enterprise's network XML documents including the attributes, settings parameters, etc. provided by the user when modeling the process, which are captured by the application template and the appropriate connector, trading partner and/or data profile codesets for a specific integration process. For example, this may include the trading partner attributes of the partner being connected to, data transformation rules, data format layouts, business logic rules, specific error handling routines, etc. The enterprise network receives this data, as shown at block 406. At this point the software components collectively provide the customized software application is ready for execution to exchange data. The application may run in an automated manner without requiring any human intervention.

The enterprise system then executes the customized software application by executing the application template, as shown at block 408. Accordingly, when the application template is executed, the combination of the application template, the downloaded pre-built XML documents corresponding to the process modeled by the user, and the XML documents capturing user input provided during modeling of the process, are executed to provide a customized business process integration software application. When the dynamic runtime engine executes a particular customized integration process, the enterprise system 90 transmits and/or receives data, in this example with the trading partner's system 60. For example, Purchase Order data may be retrieved by the integration process out of system 30, where it is transformed during execution of the integration process into the format required by system 60, and is then transmitted to the trading partner's system 60 via the communications network 50. In turn, the trading partner's system 60 receives this data using their own EDI integration software. This and other types of exchanges are of a conventional nature and are well known to those skilled in the art.

Subsequently, the customized software application will report the results of all processes executed as they complete to system 80, as shown at block 410. The user may then connect to system 80 using a web browser via a device such as system 20 to view the status of the dynamic runtime engine executions. Such information may include the status of a particular process execution (success, failure), how many documents were processed, how the long the process took to run, etc. Only reporting information is transmitted from the enterprise system to the service provider system 80, not the actual data being processed. The service provider can receive error reports, operational logs, and the like to facilitate customer support, troubleshooting, etc.

In an embodiment, the customized application may be configured to be "self-updating." More specifically, the dynamic runtime engine application is configured to check for components it requires to automate the modeled business process, and to automatically initiate download of any updated component on the server newer than a corresponding component resident at the enterprise network, thus updating the application. Accordingly, the dynamic runtime engine is configured to connect to system 80 to download both application settings for the application template as well as additional software components.

Further, the dynamic runtime engine application can be configured to check for a new/revised model of a process, for example as a result of a user's operation of the system 80 to retrieve, modify and save a previously constructed business process model, and to retrieve any additional, new or modified components from the server that are newer than a corresponding component resident at the enterprise network, thus maintaining the application. Accordingly, as new versions of software components running inside the dynamic runtime engine are available, the dynamic runtime engine will download and apply those updates from system 80 without requiring any human intervention.

Accordingly, after the system 80 is initially established, the system 80 can be used repeatedly by a single enterprise to model and automate various different business processes, or by various different enterprises with various different enterprise system attributes and each enterprise can model, and subsequently use, an appropriate customized software application that is custom-tailored to its specific needs. Further, such customized applications can be developed on-demand, as needed, in real time, and without the need for programmers or programmer expertise, etc. Instead, the system exists as a website accessible for use, essentially at will, subject to any applicable subscription, service level or other access restrictions.

In an embodiment, the automated software development system, and the web based graphical user interface in particular, provides users with a test mode to facilitate debug and validation of an integration process being developed. The test mode allows a user to test integration processes from within the build-environment without needing to deploy the actual process integration software. The test mode is intended to provide immediate feedback on process configuration for use during initial development. The test mode provides results and detailed logging information for each element of the integration process model to assist with validation and troubleshooting.

When executing an integration process model in the test mode, a virtual instance of the process actually runs. Accordingly, data runs through the process so records are moved, created, modified, and deleted according to the process configuration. As a process executes in test mode, the user can watch the progression of documents through the process steps/elements. Once the test has finished, the user can view a log file and data files that have been produced or modified. For example, Connector elements have a connection data tab that displays inbound/outbound documents along with any Connector-specific tracking information. A link is provided to view data contents using a document viewer. In addition, the results of child processes, resulting from a process call, can be reviewed. In an embodiment, tests can be repeated as a process model is updated, preventing a user from having to re-run from scratch and continuously access source systems to bring documents into the process flow. The graphical user interface can provide visual indicators to identify whether a process element performed successfully during a test. For example, an Inbound element that successfully accessed an application document can be identified by a green color, while erroneous behavior is identified using a red color. If an error occurs during execution of a test, a dialog box can be displayed containing an error message.

In another embodiment of the present disclosure, users can submit integration processes and associated tests and test data to a system regression library. The service provider can use these tests to verify updated releases of the automated software development system. For example, the service provider can verify that integration processes previously developed by users will work correctly with future releases of the automated system. Users can voluntarily choose whether to participate in the regression program by submitting tests to be included in the regression library. Further, users can withdraw a previously submitted test from the library.

Figure 5:
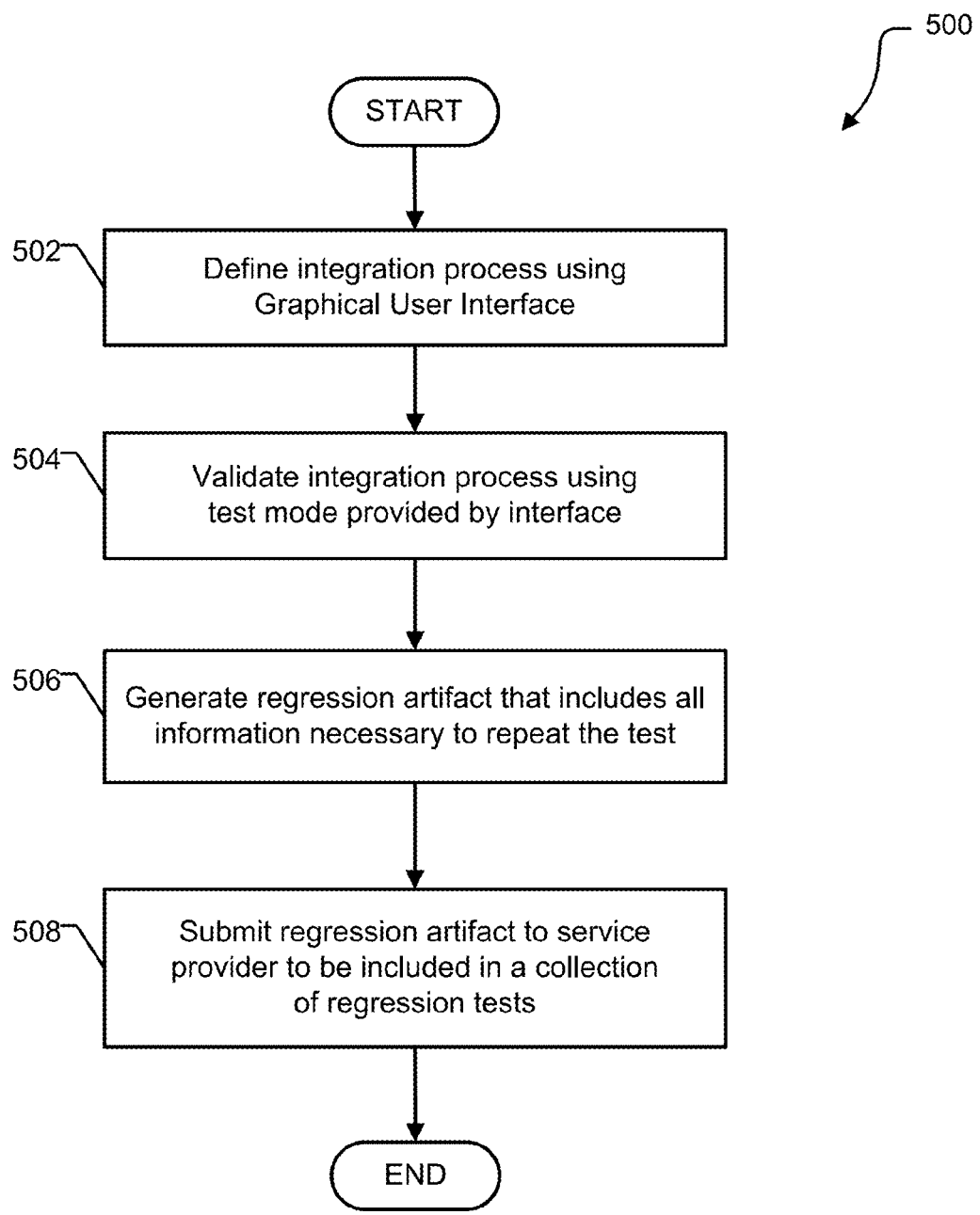
FIG. 5 is a flow diagram illustrating a method for submitting an integration process test to a regression suite according to an embodiment of the present disclosure.

FIG. 5 shows a method 500 for submitting an integration process test to a regression suite according to an embodiment of the present disclosure. The method begins at block 502 where an integration process is defined using a graphical user interface at an automated software development system. For example, a service provider and associated system/server 80 can provide users with a web-based visual editor to define a custom integration process, as described above. The flow proceeds to block 504 where the user prepares and executes tests to verify correct operation of the integration process. For example, the graphical user interface can provide a test mode, wherein a user of the system can simulate operation of the custom integration process model. The flow proceeds to block 506 where the user generates a regression artifact. The regression artifact includes all aspects of the custom process model and associated data that are necessary to reproduce a test performed by the user. The flow proceeds to block 508 where the user submits the regression artifact to the service provider to be included in a collection of regression tests.

A regression artifact is a fully self-contained collection of files that represents a process model and an associated test of the model. In other words, a regression artifact contains all configuration and data needed to recreate an execution of a test conducted by a user of the automated software development system. In an embodiment, the regression artifact can include a regression-config.xml file, process data, component XMLs, overrides, and the like. While terminology used herein may be proprietary, one skilled in the art will understand that these items merely enumerate the collection of data and software components that together constitute a process test model. As used herein, a regression-config.xml is an XML file that contains all the "meta" information needed to recreate the process run. It contains information such as the order the shapes were executed, what data went into/came out of each shape and what properties existed at the time the shape was executed. Process data is the actual data that flowed through the process. This data will be used as input data during the regression run and it will be used to validate the output data of the regression run. Component XMLs are the collection of XML files that make up the process. For example, if the process used a Flat File Profile, the Flat File Profile component XML would be in this collection. Overrides are an example of a test configuration parameter. The automated software development system allows users to override certain process settings at runtime. The Overrides file contains a list of properties and corresponding overridden values that are established when a regression test is executed.

Figure 6:
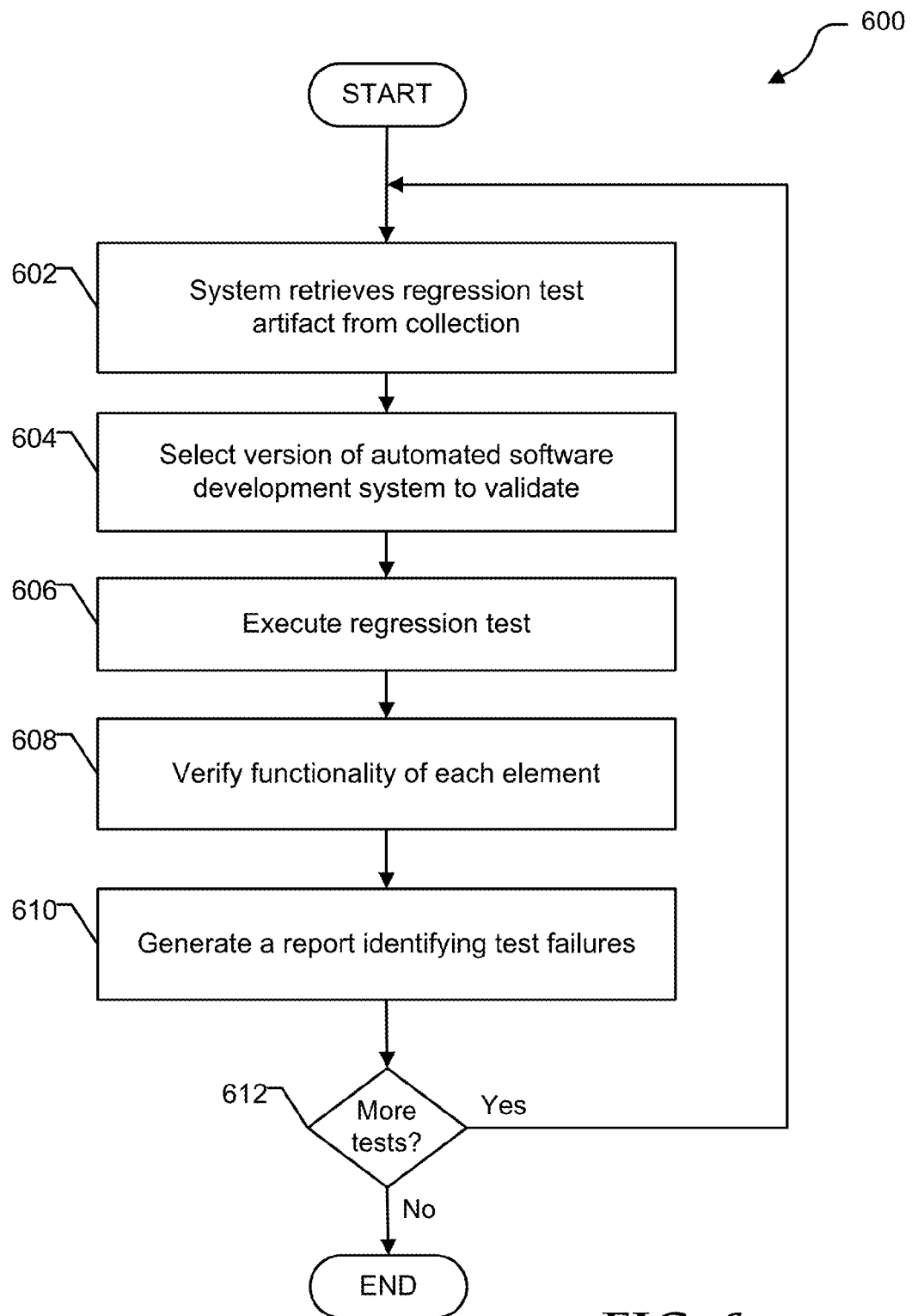
FIG. 6 is a flow diagram illustrating a method for verifying the automated software development system using user-provided tests according to an embodiment of the present disclosure.

FIG. 6 shows a method 600 for verifying an automated software development system using user-provided tests according to an embodiment of the present disclosure. The method 600 describes how developer of the automated software development system can augment proprietary testing of the system with additional test cases submitted by users of the system. For example, when the service provider updates the system software to apply a functional enhancement or to correct an operation issue, the service provider typically performs exhaustive testing of the software before releasing the revised software for use by customers. The testing capability of the service provider can be greatly enhanced based on a collection of test cases provided by users of the system.

The method begins at block 602 where the automated software development system, and a regression test system in particular, retrieves a regression test artifact from a collection of test artifacts. For example, once the system provider has modified the development system software and performed testing based on internally generated tests, the provider can execute a test artifact provided by a user of the system to verify that integration process defined in the test artifact operates identically to how it operated using a previous version of the development system. The flow proceeds to block 604 where the service provider selects a version of the automated software development system that is to be validated. For example, a version of the development system may be under development that includes new features. It is important that the updated system software does not inadvertently impair existing functionality or performance. Accordingly, the flow proceeds to block 606 where the service provider executes the regression test represented by the regression test artifact. For example, the test artifact include data files representing all aspects of an integration process model and associated test data, such as input data received from an application at the beginning of a process. Therefore, the regression test includes every piece of information previously utilized during the original testing of the process by a user.

The flow proceeds to block 608 where the service provider verifies the functionality of each element included in the process model defined in the regression test artifact. For example, each element instantiated by the process model is configured to perform an explicit function, such as to map data received from one application to a profile associated with another application. The test regression artifact not only includes a description of the functionality of each element, but also includes a representation of the data received at each element and a representation of the data generated by the element during the original testing by the user who submitted the test to the regression test collection. Therefore, the service provider can verify that the revised development system software performs identically to the previous version of the system originally employed by the user during development of their process model. As described above, the test artifact provides a self-contained test entity so a corresponding regression test can be conducted in isolation. As such, the test cannot include external calls to processes or applications remote to the test. However, in an embodiment, such calls can be supported by the test artifact generator by creating a virtual process element corresponding to the external entity and merging the virtual proxy process into the integration process encapsulated by the test artifact.

The flow proceeds to block 610 where the test regression system generates a report identifying whether any errors were encountered during execution of the regression test. At decision block 612, the regression test system determines whether addition regression tests submitted by user of the development system are available. If further tests are available, the flow returns to block 602 where validation of the development system continues using another regression test case. Otherwise, the method is complete. In an embodiment, the test regression system can perform system analytics based on results of executing a collection of regression tests. For example, the system can determine whether, and how extensively, each process element included in the automated software development system element library was tested. The test regression system can generate a report summarizing results of executing the collection of tests. In another embodiment, the report can include graphics, such as tables, graphs, pie charts, and the like, to visually emphasize test aspect of the report. For example, deficiencies in test coverage can be highlighted.

The regression test system takes advantage of the multi-tenancy aspect of the automated software development system by allowing customers/users of the system to help test and maintain functionality of the development system. Consequently, the users benefit by receiving a higher quality service. Participation by users, by submitting test artifacts, is typically voluntary. However, in an embodiment, tests performed by users can be automatically harvested and included in a regression test suite. In an embodiment, submission of a test artifact can be done anonymously, wherein the identity of the user submitting the test is not identified by the test artifact. In another embodiment, a user can remove a previously submitted test artifact from the test suite. In still another embodiment, an integration process submitted by a user can include process elements that are not captured or are not supported by the test regression system. For example, a process including custom software scripts, encryption processes, and the like, can be excluded from a corresponding test artifact.

Numerous software applications exist today that can enable these types of automated exchanges. However due to the complexity of the setting up these processes, capabilities such as this are typically in the domain of larger enterprises with more sophisticated IT capabilities. Smaller organizations are therefore negatively impacted by not being able to participate in automated exchanges such as this, and are forced to pay exorbitant fees to outsourced EDI providers, or avoid automating these processes at all, and instead continue to use people-centric processes such as phone/fax/email for exchange this information. Further, as software applications known as Software as a Service continue to emerge and gain popularity, enterprises need to integrate their internal applications with these applications hosted by the SaaS provider. Integrating these systems is complex and expensive, requiring expensive consultants to setup and implement the systems. The present disclosure opens a new window of opportunity for tech savvy employees of smaller enterprises to now participate in the benefits of integration. The present disclosure makes this possible by changing the technical capabilities and requirements of setting up, deploying and maintaining integration processes. Using only a web browser a user can automate integration processes for a specific enterprise, and then download the dynamic runtime engine application containing just the enterprise-specific processes and run this dynamic runtime engine on the enterprise's existing infrastructure.

The dynamic runtime application is a very "lightweight" application because unlike other "static" software applications, the dynamic runtime engine is able to install just the software components that are needed to execute the integration processes for a particular enterprise. Conventional integration server software applications have been distributed as a pre-built application on a series of CD's, where it must be manually installed, and manually upgraded as new versions are made available by the software vendor.

It should be noted that the disclosed method and system is not merely a conventional client/server arrangement. Instead, the software application to be executed within a specific enterprise system is custom-built using pre-built codesets selected as a function of user input, and user input, in view of specific enterprise system attributes, and is "pulled" from the system 80 by the dynamic runtime engine that is installed in system 20 or system 30. This requires the software application to be designed and built under the assumption that it will not be executed in the same network in which it was built. It should be further noted that although the example above discusses "business-to-business integration" between applications of a trading partner system and an enterprise system in different networks, that the present disclosure is equally applicable to integrate between different applications within the enterprise system, such as for "application integration". For example, a customized business integration software application may be built as described herein for use among customer relationship management, inventory control, purchasing, accounting or other enterprise systems within the enterprise system network. Also, the present disclosure is equally applicable to integrate between applications within the enterprise system and applications running outside of the enterprise system, commonly referred to as Software as a Service solution or SaaS integration. For example, a customized business integration software application may be built as described herein for storing customer information, and this data must be synchronized with a customer relationship management application.

Figure 7:
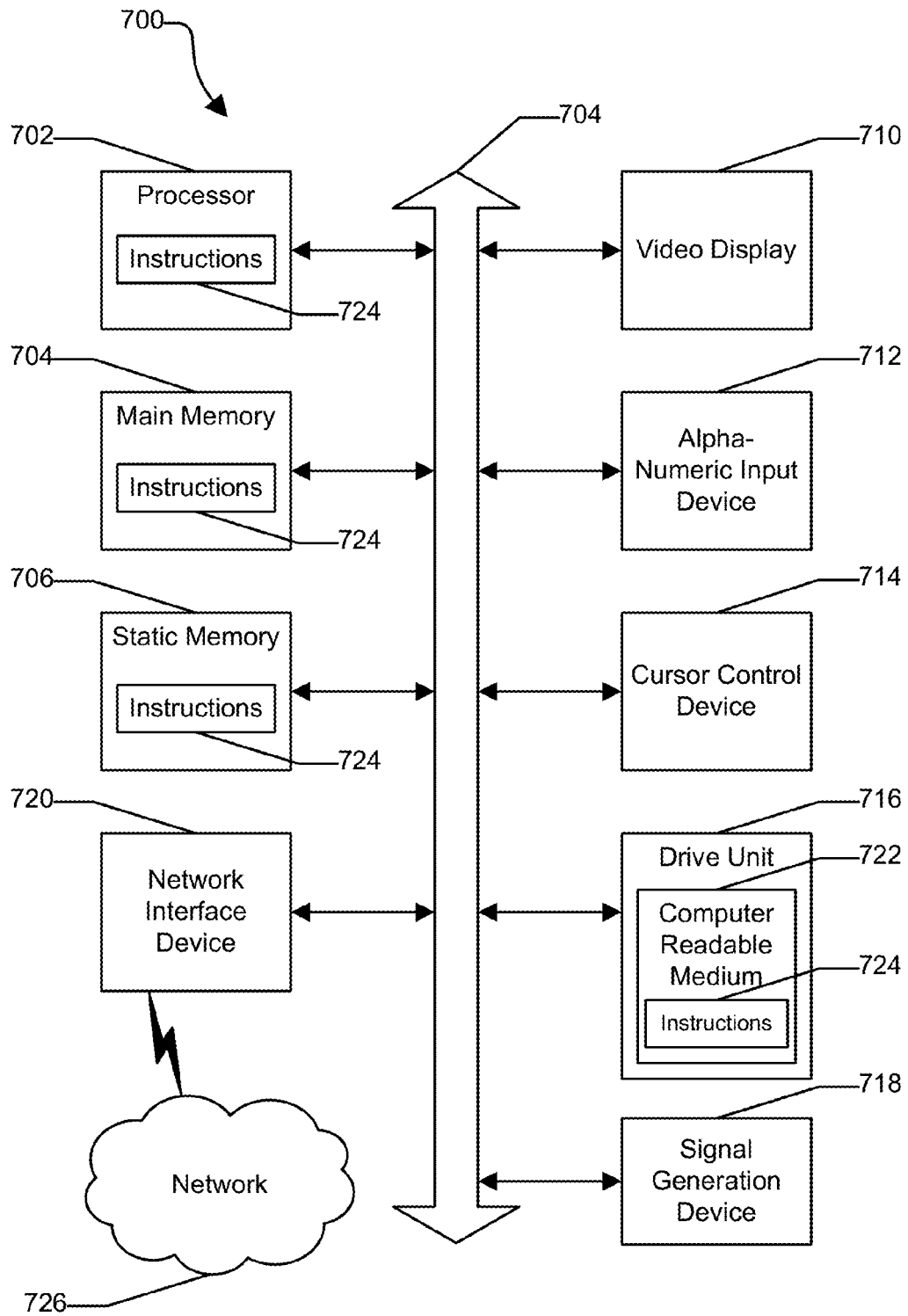
FIG. 7 illustrates a block diagram of an information handling system according to and embodiment of the present disclosure.

FIG. 7 shows an information handling system 700 capable of administering each of the specific embodiments of the present disclosure. The information handling system 700 can represent the user device 20, the systems 30, 60, 70, and 80 of FIG. 1, or another data processing device associated with the business network system 10. The information handling system 700 may include a processor 702 such as a central processing unit (CPU), a graphics processing unit (GPU), or both. Moreover, the information handling system 700 can include a main memory 704 and a static memory 706 that can communicate with each other via a bus 708. As shown, the information handling system 700 may further include a video display unit 710, such as a liquid crystal display (LCD), an organic light emitting diode (OLED), a flat panel display, a solid state display, or a cathode ray tube (CRT). Additionally, the information handling system 700 may include an input device 712, such as a keyboard, and a cursor control device 714, such as a mouse. The information handling system 700 can also include a disk drive unit 716, a signal generation device 718, such as a speaker or remote control, and a network interface device 720. The information handling system 700 can represent a server device whose resources can be shared by multiple client devices, or it can represent an individual client device, such as a desktop personal computer.

The information handling system 700 can include a set of instructions that can be executed to cause the computer system to perform any one or more of the methods or computer based functions disclosed herein. The computer system 700 may operate as a standalone device or may be connected such as using a network, to other computer systems or peripheral devices.

In a networked deployment, the information handling system 1000 may operate in the capacity of a server or as a client user computer in a server-client user network environment, or as a peer computer system in a peer-to-peer (or distributed) network environment. The information handling system 700 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 700 can be implemented using electronic devices that provide voice, video or data communication. Further, while a single information handling system 700 is illustrated, the term "system" shall also be taken to include any collection of systems or sub-systems that individually or jointly execute a set, or multiple sets, of instructions to perform one or more computer functions.

The disk drive unit 716 may include a computer-readable medium 722 in which one or more sets of instructions 724 such as software can be embedded. Further, the instructions 724 may embody one or more of the methods or logic as described herein. In a particular embodiment, the instructions 724 may reside completely, or at least partially, within the main memory 704, the static memory 706, and/or within the processor 702 during execution by the information handling system 700. The main memory 704 and the processor 702 also may include computer-readable media. The network interface device 720 can provide connectivity to a network 726, such as a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 724 or receives and executes instructions 724 responsive to a propagated signal; so that a device connected to a network 726 can communicate voice, video or data over the network 726. Further, the instructions 724 may be transmitted or received over the network 726 via the network interface device 720.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A computer-implemented method comprising:
   providing, at a service provider, an automated software development system, the automated software development system enabling a subscriber of the service provider to develop a customized software application, the automated software development system including a graphical user interface accessible to the subscriber using an Internet web browser, the graphical user interface comprising:
   a menu identifying a collection of visual modeling elements, each element corresponding to an individual process component and associated with a respective codeset;
   a visual design environment at which selected visual modeling elements can be instantiated and interconnected to generate a visual model representing an integration process;
   a test interface for validating operation of the integration process rendered at the visual design environment based on test data received at the integration process, the validation providing test results generated by process components of the integration process during the validation; and
   a graphical button for submitting a test artifact to the service provider, the test artifact for use only by the service provider to verify correct operation of the automated software development system, the test artifact including a representation of the integration process, the test data, and the test results; and
   providing the customized software application to the subscriber, the application comprising a collection of codesets that together are configured to perform the integration process.

2. The method of claim 1, further comprising:
   storing a collection of test artifacts submitted by subscribers of the service provider; and
   verifying operation of a software revision of the automated software development system based on a first test artifact of the collection of test artifacts.

3. The method of claim 2, further comprising generating a report enumerating test coverage of each visual modeling element of the collection of visual modeling elements based on the verifying.

4. The method of claim 1, wherein the test artifact includes all information necessary for the service provider to reproduce execution of a validation test submitted by the subscriber.

5. The method of claim 1, wherein the collection of visual modeling elements includes a trading partner element, an associated codeset comprising data required for electronic communication with an information handling system at a specific trading partner.

6. The method of claim 1, wherein the collection of visual modeling elements includes a connector element, an associated codeset comprising data required for electronic communication in accordance with a specific application programming interface.

7. The method of claim 1, further comprising receiving from the subscriber, via the graphical user interface, user input providing data attributes for at least one visual modeling element of the visual model, the user input comprising information unique to a specific integration process.

8. The method of claim 7, further comprising preparing a data profile codeset including an Extensible Markup Language representation of the user input.

9. The method of claim 1, wherein providing the customized software application to the subscriber further comprises transmitting an executable container installation program to an enterprise system associated with the subscriber, the container installation program being executable within the enterprise system to install a container program, the container program being executable to initiate transmission from the service provider to the enterprise system of at least one of a connector codeset, a trading partner codeset and a data profile codeset.

10. An automated software development system for creating a customized software application, the system comprising:
    a memory;
    a microprocessor operatively connected to the memory;
    computer-readable program code stored in the memory and executable by the microprocessor to:
    provide, at a service provider, an automated software development system, the automated software development system enabling a subscriber of the service provider to develop a customized software application, the automated software development system including a graphical user interface accessible to the subscriber using an Internet web browser and comprising:
- a menu identifying a collection of visual modeling elements, each element corresponding to an individual process component and associated with a respective codeset;
- a visual design environment at which selected visual modeling elements can be instantiated and interconnected to generate a visual model representing an integration process;
- a test interface for validating operation of the integration process rendered at the visual design environment based on test data received at the integration process, the validation providing test results generated by process components of the integration process during the validation; and
- a graphical button for submitting a test artifact to the service provider, the test artifact for use only by the service provider to verify correct operation of the automated software development system, the test artifact including a representation of the integration process, the test data, and the test results; and provide the customized software application to the subscriber, the application comprising a collection of codesets that together are configured to perform the integration process.

11. The system of claim 10, further comprising computer-readable code stored in the memory to:
- store a collection of test artifacts submitted by subscribers of the service provider;
- verify operation of a software revision of the automated software development system based on a first test artifact of the collection of test artifacts; and
- generate a report enumerating test coverage of each visual modeling element of the collection of visual modeling elements based on the verifying.

12. The system of claim 10, wherein the test artifact includes all information necessary for the service provider to reproduce execution of a validation test submitted by the subscriber.

13. The system of claim 10, wherein the collection of visual modeling elements includes a trading partner element, an associated codeset comprising data required for electronic communication with an information handling system at a specific trading partner.

14. The system of claim 10, wherein the collection of visual modeling elements includes a connector element, an associated codeset comprising data required for electronic communication in accordance with a specific application programming interface.

15. The system of claim 10, further comprising computer-readable program code stored in the memory and executable by the microprocessor to:
- receive from the subscriber, via the graphical user interface, user input providing data attributes for at least one visual modeling element of the visual model, the user input comprising information unique to a specific integration process; and
- prepare a data profile codeset including an Extensible Markup Language representation of the user input.

16. The system of claim 10, wherein providing the customized software application to the subscriber further comprises transmitting an executable container installation program to an enterprise system associated with the subscriber, the container installation program being executable within the enterprise system to install a container program, the container program being executable to initiate transmission from the service provider to the enterprise system of at least one of a connector codeset, a trading partner codeset and a data profile codeset.

17. A computer program product for automating creation of a customized software application, the computer program product comprising:
- a non-transitory computer-readable storage medium having computer-readable program code embodied in the medium, the computer-readable program code comprising:
 computer-readable program code that provides, at a service provider, an automated software development system, the automated software development system enabling a subscriber of the service provider to develop a customized software application, the automated software development system including a graphical user interface accessible to the subscriber using an Internet web browser and comprising:
 - a menu identifying a collection of visual modeling elements, each element corresponding to an individual process component and associated with a respective codeset;
 - a visual design environment at which selected visual modeling elements can be instantiated and interconnected to generate a visual model representing an integration process;
 - a test interface for validating operation of the integration process rendered at the visual design environment based on test data received at the integration process, the validation providing test results generated by process components of the integration process during the validation; and
 - a graphical button for submitting a test artifact to the service provider, the test artifact for use only by the service provider to verify correct operation of the automated software development system, the test artifact including a representation of the integration process, the test data, and the test results; and
 computer-readable program code that provides the customized software application to the subscriber, the application comprising a collection of codesets that together are configured to perform the integration process.

18. The computer program product of claim 17, further comprising computer-readable code that:
- stores a collection of test artifacts submitted by subscribers of the service provider;
- verifies operation of a software revision of the automated software development system based on a first test artifact of the collection of test artifacts; and
- generates a report enumerating test coverage of each visual modeling element of the collection of visual modeling elements based on the verifying.

19. The computer program product of claim 17, wherein the test artifact includes all information necessary for the service provider to reproduce execution of a validation test submitted by the subscriber.

20. The computer program product of claim 17, wherein the collection of visual modeling elements includes a trading partner element, an associated codeset comprising data required for electronic communication with an information handling system at a specific trading partner.

* * * * *